Mar. 6, 1923.
R. HILL.
MACHINE FOR MEASURING THE LEAD OF SCREW THREADS.
FILED JAN. 2, 1920.
1,447,416.
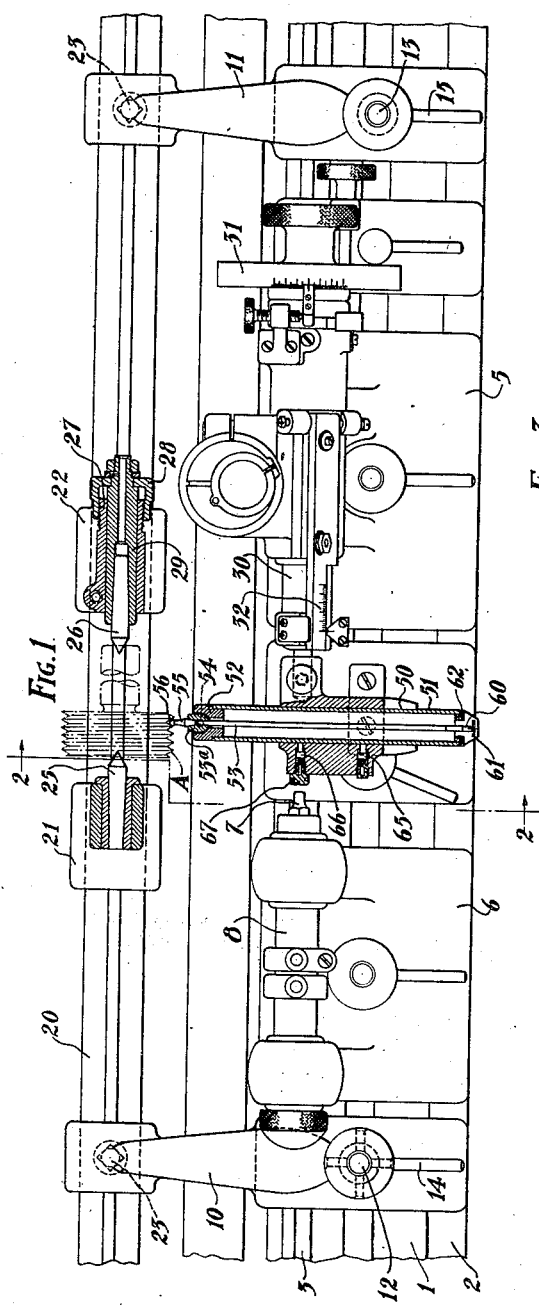
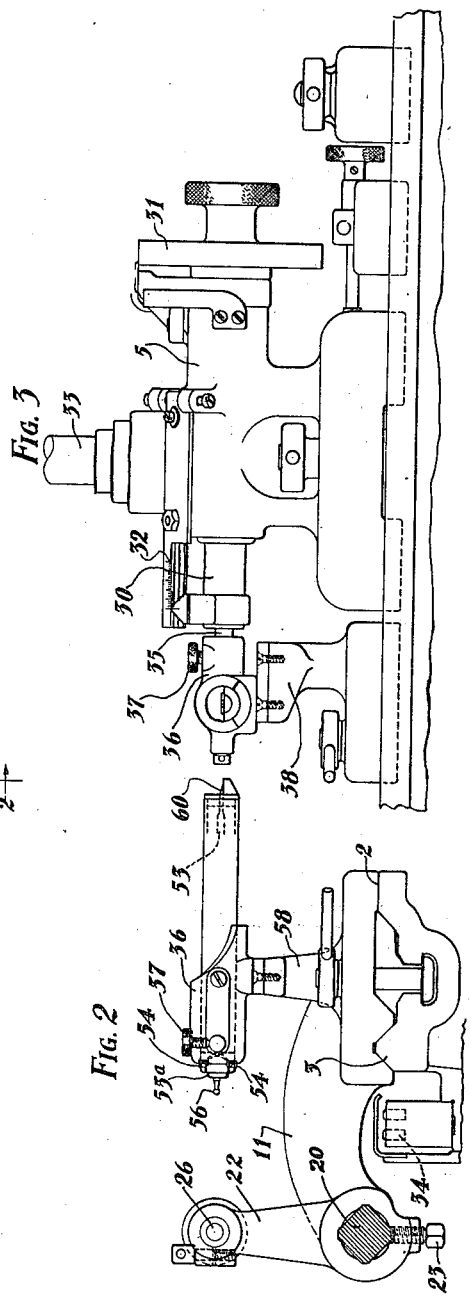
Inventor
Reuben Hill.
By S. Jay Teller
Attorney Patented Mar. 6, 1923.

1,447,416

UNITED STATES PATENT OFFICE.

REUBEN HILL, OF HARTFORD, CONNECTICUT, ASSIGNOR TO PRATT & WHITNEY COMPANY, OF NEW YORK, N. Y., A CORPORATION OF NEW JERSEY.

MACHINE FOR MEASURING THE LEAD OF SCREW THREADS.

Application filed January 2, 1920. Serial No. 348,995.

*To all whom it may concern:*

Be it known that I, REUBEN HILL, a citizen of the United States, residing at Hartford, in the county of Hartford and State of Connecticut, have invented certain new and useful Improvements in Machines for Measuring the Lead of Screw Threads, of which the following is a specification.

This invention relates to measuring machines and in particular to a machine or device for measuring the distance between adjacent screw-threads of a single or multiple start screw to a high degree of accuracy.

The principal object of the present invention is to provide an attachment which may be rigidly mounted on the measuring spindle of a linear measuring machine to measure the lead or longitudinal pitch of screw-threads, that is, the distance between adjacent threads of a screw.

Another object of the present invention is to provide the attachment for measuring the lead of a screw with a measuring contact or plug so that the measuring machine may be utilized for ordinary linear outside measurements while the attachment or device is in position.

A further object of the present invention is to provide the attachment or device for measuring the lead or pitch of a screw with a transversely movable or slidable member adapted to engage the threads to be measured carrying a sensitive indicator to accurately locate the attachment or device relative to the screw-threads under examination.

The invention may be carried out in an attachment or device adapted to be directly applied to the measuring spindle of a standard measuring machine but a special machine may be devised particularly for the purpose of measuring leads or longitudinal pitch of screws which would embody the present invention and be within the scope of the present claims.

In the accompanying drawing I have shown the embodiment of the invention which I now deem preferable but it is to be understood that changes and modifications may be made within the scope of the appended claims without departing from the spirit of the invention.

Referring to the figures of the drawings annexed hereto and forming a part of the specification:

Fig. 1 is a plan view of the attachment mounted upon a measuring machine with the thread engaging member in operative position.

Fig. 2 is a fragmentary view showing the attachment in elevation taken on line 2—2 of Fig. 1 with the thread engaging member in retracted position.

Fig. 3 is a view in elevation of the measuring headstock of a measuring machine on which the attachment forming the present invention is preferably mounted.

As illustrated in the drawing, the embodiment of the invention in its entirety comprises the following elements: first, a base or bed; second, mechanism for holding or mounting the screw to be measured, this mechanism preferably comprising centers together with suitable supporting elements therefor carried by the bed; third, a measuring head having a longitudinally movable spindle, the head being mounted on the bed and preferably bodily movable therealong; fourth, a thread engaging indicating device carried by the measuring spindle; and, fifth, a tailstock mounted on the bed and preferably bodily movable therealong. The invention may be embodied in a unitary machine particularly constructed for the measurement of thread leads but by preference I utilize a standard linear measuring machine. In this case the body, the measuring head and the tailstock are parts of the standard measuring machine and the work holding mechanism together with the thread engaging indicator constitute an attachment adapted to be applied to the standard measuring machine.

Referring more particularly to the figures of the drawing, 1 refers to a base which may take the form of a standard measuring machine base having an accurately surfaced top face 2 on which is provided the way 3. On the surface 2 of the base 1 is mounted a measuring head 5, to be more particularly described in a later part of this specification, and a tailstock 6 carrying the usual measuring plug 7 at the forward end of spindle 8.

In place of the base 1 and headstock 5 a special base may be devised having mounted thereon a measuring spindle with which a thread-engaging element is adapted to be associated. This latter base and measuring spindle together with a mounting for the specimen to be measured and the thread-engaging element would provide a machine for testing the lead or pitch of screw-threads exclusively but would still be within the spirit and scope of the claims.

Tailstock 6 on which the measuring plug 7 is mounted forms no part of the present invention and is not used when the machine is used for measuring the lead of thread screws. The presence of the screw lead measuring device, however, in no way interferes with the operation of this tailstock in its ordinary use for outside linear measurements.

In addition to the headstock 5 and the tailstock 6 the base 1 is provided with brackets 10 and 11 which may be clamped to the base 1 by means of screws 12 and 13 under the control of handles 14 and 15. Supported at the outer ends of brackets 10 and 11 is shaft or bar 20 which in the form shown in the drawings is square, but it is obvious that any other shape or form of shaft may be utilized so long as means are provided to prevent rotation thereof. Along the shaft 20 slide pedestals 21 and 22 which may be fastened to shaft 20 by means of set screws 23 or any other convenient means. Pedestal 21 carries a stationary center 25 and pedestal 22 a center 26 adapted to be forced toward or away from the center 25 by means of a screw 27 provided at the head of pedestal 22.

Meshing with screw 27 is a cap 28, the rotation of which forces the slide 29 in which the center 26 is secured forwardly and backwardly. Shaft 20 is held in place by brackets 10 and 11 in exact parallelism with the spindle 30 in the headstock 5. Any means may be employed to fasten the rod 20 to brackets 10 and 11 such as set screws 23.

The headstock 5 shown in the drawing is one of standard form, but it is obvious that any form of measuring head may be used that provides means for clamping the device or attachment forming the present invention to a measuring spindle so that it will be movable directly or parallel therewith. Measuring head 5 is provided with spindle 30 as above indicated and also with graduated dial 31 and scale 32 by means of which the axial position of spindle 30 may be accurately determined. Incorporated with the head 5 is microscope 33 serving to accurately position the head 5 directly over one of the positioning spots 34. Secured to spindle 30 of stockhead 5 on its measuring plug 35 is the device or attachment 36 forming the basis of the present invention.

A machine made for measuring the lead of screw-threads exclusively may have the measuring spindle and carrier for the thread engaging member formed integrally but I preferably, as shown in the drawings, provide a detachable clamping device for mounting the device or attachment to the measuring spindle of a sensitive linear measuring machine.

Device 36 is shown clamped to measuring plug 35 by means of screw 37 holding the attachment rigidly in alignment therewith and preventing any lateral movement between the device and the spindle 30 of measuring plug 35. Below the device 36 a small table 38 is provided surfaced at its top face and securely clamped to surface 2 of base 1, thus providing an additional support or rest for the attachment 36, and relieving the spindle 30 from bending strains due to the weight of the device 36.

Referring now more particularly to the device 36 by means of which the lead or pitch of screw-threads may be accurately determined, this device, which, it will be seen, will have a movement equal to and parallel to the measuring spindle 30, is provided with a groove or orifice 50 extending completely across the device 36 and extending directly toward and away from the specimen to be tested. Within this groove or orifice 50, a member 51 is preferably adapted to slide. It may however be adapted to be advanced to thread-engaging position by any other method.

Preferably member 51 may be in the form of a tube, but it is to be understood that this is only for the purposes of illustration and the invention is in no way limited to this specific form. At one end of tube or member 51 is a plug 52 in which a lever 53 is adapted to pivot. Preferably, the plug 52 is provided with small screws 54 about which the lever 53 may oscillate in a horizontal plane. Preferably the pointed ends of screws 54 are in engagement with a body portion 53ª of lever 53 which is in the form of a portion of a sphere. It will thus be seen that means have been provided whereby the lever 53 may be sensitively pivoted on the screws 54 and about which it is adapted to swing within the tube member 51. Inserted in the end of lever 53, preferably in the body portion 53ª, is plug 55 which at its free end is provided with a small ball 56 adapted to enter the space between the threads of the screw to be tested. The ball 56 is at a very short distance from the screws 54 about which the lever 53 pivots so that a slight movement laterally of the ball 56 when in engagement with the sides of the screw-thread to be tested will produce a very wide movement at the opposite end of the lever 53. This end of the lever 53 which is also secured in the body member 53ª is provided with a pointer 60 at its outer or free end which has a limited movement laterally over a scale 61 provided on a plug 62 inserted in the outer end of tube 51.

The above description of member 51 and lever 53 has been made specific to the showing of the drawings, preferably, however, the pivoted lever is enclosed within a tube to protect the lever 53 from injury or damage.

The attachment or device 36 while in position on measuring plug 35 ready for immediate use does not interfere with the use of the measuring machine for linear outside measurements for which these machines are most commonly used. Inserted at one side of the attachment or device 36 is a measuring plug 67. This measuring plug 67 is in accurate alignment with spindle 30 and also directly in alignment with the measuring plug 7 on tailstock 6. With this measuring plug 67 readings may be taken in a similar manner to that when the measuring machine is used in its normal manner without the device 36 in place.

To frictionally engage and hold the tube member 51 within the opening extending through the body member 36, I provide spring pressed fingers 65 and 66. These are conveniently inserted within lateral openings with which the member 36 is provided and, by means of springs pressing against them, force the tube 51 always against one side of its opening. In this way any looseness of the tube 51 within its opening does not effect the accuracy of the readings.

The springs pressing against the fingers 65 and 66 are retained within their orifices by means of plugs preferably threaded into the same orifices.

In operation the device may be used substantially as follows: The screw-thread A to be measured such as that on a thread gauge or any other accurately threaded article, is mounted on centers 25 and 26 and center 26 tightened so that considerable frictional resistance to turning of the specimen is offered. The device or attachment 36 is then located approximately opposite the specimen and the slide or other member 51 pressed toward the specimen until the ball 56 comes into contact with the sides of the screw threads. The member 51 will then remain in place against the specimen by reason of slight friction against the sides of the tube 51 by the spring-pressed plugs 65 and 66. The entrance of ball 56 within the threads of the screw will force the pointer 60 to one side or the other of the scale 61. The spindle 30 of headstock 5 is then moved and carefully adjusted until the pointer 60 stands directly over the zero position on scale 61. A reading of the measuring spindle is then taken on dial 31 and scale 32 which will be the first or zero reading. The tube or other member 51 is then withdrawn slightly, the spindle 30 moved one way or another and the tube or member 51 advanced again into an adjacent thread of the screw. The spindle 30 is then adjusted until the pointer 60 stands directly over the zero position of the scale 61 and the reading of spindle 30 is again taken. The difference of these two readings of the position of spindle 30 will give the lead or distance between adjacent threads of the screw. This operation may be continued until each thread of the screw has been tested, or, if desired, the readings between a plurality of threads may be taken which will also give the measure of the distance between adjacent threads by dividing the reading by the number of threads passed over.

For determining the pitch of multiple start screws, that is, screws having a plurality of helices, the method is slightly modified so that the readings of the spindle 30 are taken from successive points in the same helix and the operation repeated or successive readings may be taken between adjoining threads of different helices from which the accuracy of the spacing of the helices may be determined.

What I claim is:

1. A device for measuring the lead of a screw, said device being adapted to be applied to a measuring machine having a measuring spindle, and comprising in combination a member adapted to be detachably mounted on and movable with said measuring spindle, a thread-engaging member carried by said first mentioned member and means to indicate the position of said first mentioned member relative to the screw-threads engaged by the second mentioned member.

2. A device for measuring the lead of a screw, said device being adapted to be applied to a measuring machine having a measuring spindle, and comprising in combination a member adapted to be movable with said measuring spindle, a thread-engaging member carried by said first mentioned member adapted to be movable relative to said first mentioned member into and out of thread-engaging contact and means to indicate the position of said first mentioned member relative to the screw-threads engaged by the second mentioned member.

3. A device for measuring the lead of a screw, said device being adapted to be applied to a measuring machine having a measuring spindle, and comprising in combination a member adapted to be movable with said measuring spindle, a tube slidably mounted in said member, a thread-engaging member carried by said tube and means to indicate the position of said first mentioned member relative to the screw-threads engaged by said thread-engaging member.

4. A device for measuring the lead of a screw, said device being adapted to be applied to a measuring machine having a measuring spindle, and comprising in combination a member adapted to be movable with said measuring spindle, a tube slidably mounted in said member, adapted to slide toward or away from a specimen to be measured, a thread engaging member carried by said tube and means to indicate the position of said first mentioned member relative to the screw-threads engaged by said thread-engaging member.

5. A device for measuring the lead of a screw, said device being adapted to be applied to a measuring machine having a measuring spindle, and comprising in combination a member adapted to be detachably attached to and movable with said measuring spindle, means for mounting the specimen to be measured parallel to the line of movement of said spindle, a screw thread-engaging member carried by said first mentioned member and means to indicate the position of said first mentioned member relative to the screw-threads, engaged by the second mentioned member.

6. A device for measuring the lead of a screw, said device being adapted to be applied to a measuring machine having a measuring spindle, and comprising in combination a member adapted to be movable with said measuring spindle, means for mounting the specimen to be measured, a thread-engaging member carried by said first mentioned member and means comprising a pivoted lever movable bodily toward or from the specimen adapted to indicate the position of said first mentioned member relative to the screw-threads engaged by the second mentioned member.

7. A device for measuring the lead of a screw, said device being adapted to be applied to a measuring machine having a measuring spindle, and comprising in combination a member adapted to be detachably attached to and movable with said measuring spindle, means for mounting the specimen to be measured parallel with the line of movement of said spindle, a thread-engaging member mounted on said first member and movable bodily toward or from the specimen and means to indicate the position of said first mentioned member relative to the screw-threads engaged by the second mentioned member.

8. A device for measuring the lead of a screw, said device being adapted to be applied to a measuring machine having a measuring spindle, and comprising in combination a member adapted to be movable with said measuring spindle, means for mounting the specimen to be measured parallel to the line of movement of said spindle, a thread engaging member carried by said first mentioned member and means comprising a pivoted lever movable bodily toward or from the specimen adapted to indicate the position of said first mentioned member relative to the screw-threads engaged by the second mentioned member.

9. A device for measuring the lead of a screw, said device being adapted to be applied to a measuring machine having a measuring spindle, and comprising in combination a member adapted to be movable with said measuring spindle, means for mounting the specimen to be measured, a thread-engaging member carried by said first mentioned member movable into and out of thread-engaging contact and means comprising a pivoted lever movable bodily toward or from the specimens adapted to indicate the position of said first mentioned member relative to the screw threads engaged by the second mentioned member.

10. A device for measuring the lead of a screw, said device being adapted to be applied to a measuring machine having a measuring spindle, and comprising in combination a member adapted to be movable with said measuring spindle, means for mounting the specimen to be measured, a thread-engaging member carried by said first mentioned member, said specimen and thread-engaging member being movable relatively to each other, and means comprising a pivoted lever movable bodily toward or from the specimen adapted to indicate the position of said first mentioned member relative to the screw-threads engaged by the second mentioned member.

11. A device for measuring the lead of a screw, said device being adapted to be applied to a measuring machine having a measuring spindle and comprising in combination a member adapted to be movable with said measuring spindle, means for mounting the specimen to be measured parallel to the line of movement of said spindle, a thread-engaging member carried by said first mentioned member movable into and out of thread-engaging contact and means comprising a pivoted lever movable bodily toward or from said specimen adapted to indicate the position of said first mentioned member relative to the screw threads engaged by the second mentioned member.

12. A device for measuring the lead of a screw, said device being adapted to be applied to a measuring machine having a measuring spindle, and comprising in combination a member adapted to be detachably attached to and movable with said measuring spindle, means for mounting the specimen to be measured, a thread-engaging member carried by said first mentioned member, said specimen and thread-engaging member being movable relatively to each other and means comprising a pivoted lever movable toward or from said specimen adapted to indicate the position of said first mentioned member relative to the screw-threads engaged by the second mentioned member.

13. A device for measuring the lead of a screw, said device being adapted to be applied to a measuring machine having a measuring spindle and comprising in combination, a member adapted to be movable with said measuring spindle, means for mounting the specimen to be measured parallel to the line of movement of said spindle, a thread-engaging member carried by said first mentioned member, said specimen and thread-engaging member being movable relatively to each other, and means comprising a pivoted lever movable bodily toward or from said specimen adapted to indicate the position of said first mentioned member relative to the screw-threads engaged by the second mentioned member.

14. A device for measuring the lead of a screw, said device comprising in combination, a base, a mounting on said base for the specimen to be measured, a measuring head on said base, a measuring spindle in said measuring head, a body member movable with said measuring spindle, said body member having a thread-engaging member mounted to move relative to said body member into and out of thread-engaging contact, and means to indicate the position of said body member relative to the screw-threads engaged by the thread engaging member.

15. A device for measuring the lead of a screw, said device comprising in combination, a measuring machine, a mounting on said measuring machine for the specimen to be measured, a measuring head on said measuring machine, a measuring spindle in said measuring head, a body member detachably attached to and movable with said measuring spindle, said body member having a thread-engaging member mounted to move relative to said body member into and out of thread-engaging contact, and means to indicate the position of said body member relative to the screw-threads engaged by the thread-engaging member.

16. A device for measuring the lead of a screw, said device comprising in combination, a base, a mounting on said base for the specimen to be measured, a measuring head on said base, a measuring spindle in said measuring head, a body member movable with said measuring spindle, said body member having a thread-engaging member mounted to move relative to said body member transversely to the movement of said measuring spindle, and means mounted on said body member to indicate the position of said body member relative to the screw-threads engaged by the thread-engaging member.

17. A device for measuring the lead of a screw, said device comprising in combination, a measuring machine, a mounting on said measuring machine for the specimen to be measured, a measuring head on said measuring machine, a measuring spindle in said measuring head, a body member detachably attached to and movable with said measuring spindle, said body member having a thread-engaging member mounted to move relative to said body member transversely to the movement of said measuring spindle, and means mounted on said body member to indicate the position of said body member relative to the screw-threads engaged by the thread-engaging member.

18. A device for measuring the lead of a screw, said device comprising in combination, a base, a mounting in said base for the specimen to be measured, a measuring head on said base, a measuring spindle in said measuring head, a body member movable with said measuring spindle, said body member carrying a scale and having a thread-engaging member mounted to move transversely to the movement of said measuring spindle, and means comprising a pivoted lever carrying a pointer adapted to pass over said scale mounted on said body member to indicate the position of said body member relative to the screw-threads engaged by the thread-engaging member.

19. A device for measuring the lead of a screw, said device comprising in combination, a measuring machine, a mounting on said measuring machine for the specimen to be measured, a measuring head on said measuring machine, a measuring spindle in said measuring head, a body member movable with said measuring spindle, said body member carrying a scale and having a thread-engaging member mounted to move transversely to the movement of said measuring spindle, and means comprising a pivoted lever carrying a pointer adapted to pass over said scale mounted on said body member to indicate the position of said body member relative to the screw-threads engaged by the thread engaging member.

20. A device for measuring the lead of a screw, said device adapted to be applied to a measuring machine having a measuring spindle and comprising in combination, a body member movable with said measuring spindle, a member carrying a scale mounted to move into and out of thread-engaging contact, a pivoted lever mounted on said latter member adapted at one end to engage the sides of the screw-thread to be measured, and a pointer at its opposite end adapted to pass over said scale.

21. A measuring machine comprising in combination a base, head and tailstocks, one of said stocks having a measuring spindle and the other having a measuring plug and a device mounted on said measuring spindle to measure the lead of a screw, a measuring plug on said device whereby said measuring machine may be used for outside measurements while said device is in position on the measuring spindle.

22. A measuring machine comprising in combination a base, head and tailstocks, one of said stocks having a measuring spindle and the other having a measuring plug and a device mounted on said measuring spindle to measure the lead of a screw, a measuring plug on said device in alignment with said first mentioned measuring plug whereby said measuring machine may be used for outside measurements while said device is in position on the measuring spindle.

In testimony whereof, I hereto affix my signature.

REUBEN HILL.